United States Patent
Wang et al.

(10) Patent No.: US 10,177,857 B2
(45) Date of Patent: Jan. 8, 2019

(54) OPTICAL MODULE AND METHOD FOR CONTROLLING OPTICAL MODULE

(71) Applicant: HISENSE BROADBAND MULTIMEDIA TECHNOLOGIES CO., LTD., Qingado (CN)

(72) Inventors: Li Wang, Qingdao (CN); Long Zheng, Qingdao (CN); Chungang Zhang, Qingdao (CN)

(73) Assignees: Hisense Broadband Multimedia Technologies Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/471,874

(22) Filed: Mar. 28, 2017

(65) Prior Publication Data

US 2017/0201331 A1    Jul. 13, 2017

(30) Foreign Application Priority Data

Sep. 26, 2016   (CN) .......................... 2016 1 0851225

(51) Int. Cl.
*H04B 10/80* (2013.01)
*H04B 10/50* (2013.01)
*H04B 10/60* (2013.01)
*H04Q 11/00* (2006.01)

(52) U.S. Cl.
CPC ........... *H04B 10/807* (2013.01); *H04B 10/50* (2013.01); *H04B 10/60* (2013.01); *H04Q 11/0005* (2013.01); *H04Q 2011/0039* (2013.01)

(58) Field of Classification Search
None
See application file for complete search history.

(56) References Cited

U.S. PATENT DOCUMENTS

| | | | |
|---|---|---|---|
| 2003/0048511 A1* | 3/2003 | Tsumori | H04B 10/1143 398/139 |
| 2009/0116840 A1* | 5/2009 | Perasso | H04B 10/294 398/83 |
| 2011/0142456 A1 | 6/2011 | Takahashi et al. | |

FOREIGN PATENT DOCUMENTS

| | | |
|---|---|---|
| CN | 101867414 A | 10/2010 |
| CN | 102820930 A | 12/2012 |

OTHER PUBLICATIONS

Office Action from corresponding Chinese Application No. 201610851225.7 dated Mar. 20, 2018 (5 pages).

* cited by examiner

*Primary Examiner* — Darren E Wolf
(74) *Attorney, Agent, or Firm* — Harness, Dickey & Pierce, P.L.C.

(57) ABSTRACT

This disclosure discloses an optical module and a method for controlling optical module. The optical module includes a controller and a port, wherein the controller is configured to receive a state signal from an optical chip, the state signal is a continuous signal, and output a non-continuous signal to a port pin of the port according to the state signal; the port pin is configured to output the non-continuous signal, and receive a non-continuous response signal in an interval period of the non-continuous signal; and the controller further also configured to receive the response signal from the port pin, and control a power supply to supply power according to the response signal.

15 Claims, 6 Drawing Sheets

--Prior art--

--Prior art--

--Prior art--

--Prior art--

US 10,177,857 B2

OPTICAL MODULE AND METHOD FOR CONTROLLING OPTICAL MODULE

CROSS-REFERENCE TO RELATED APPLICATION

This application claims benefit and priority of Chinese Patent Application No. 201610851225.7 filed Sep. 26, 2016. The entire disclosure of the above application is incorporated herein by reference.

FIELD

This disclosure relates to the technical field of optical communication, in particular to an optical module and a method for controlling optical module.

BACKGROUND

This section provides background information related to the present disclosure which is not necessarily prior art.

In an optical module product, when finding that front end light is less than a LOS threshold, a receiver chip will send a LOS-ASSERT alarm, and a LOS pin of the receiver chip is usually a high level of a digital signal; when the front end light changes from being less than the alarm threshold to being greater than the alarm threshold and exceeds a DEASSERT threshold set for the chip, the receiver chip will return to a LOS-DEASSERT state, and the LOS pin of the receiver chip is usually configured as a low level of the digital signal. This LOS state will be output to a system through a LOS output interface (LOS pin) of the optical module, the system only reads the state of the optical module at this LOS pin usually, and the LOS pin can only output a function of a LOS-ASSERT or LOS DEASSERT state signal of the module to the system, and does not have other functions.

In some special cases, it is required to add some functions at a module when a LOS signal appears, so that the system can not only read the state of the module through the LOS pin but also transfer a power shut instruction to the module through a newly defined pin. For example, after responding to a LOS-ASSERT signal, the system will respond to a power shut instruction (RX-POWER SHUT) of a power supply of the receiver chip, or a power shut instruction (POWER SHUT) of a general power supply in an ideal case, so as to perform power cut on a receiving end of the module or the entire power supply.

SUMMARY

This section provides a general summary of the disclosure, and is not a comprehensive disclosure of its full scope or all of its features.

Some embodiments of this disclosure provide an optical module, including: a port, a controller, an optical chip, and a power supply; the port is configured with a port pin;

the controller is configured to receive a state signal from the optical chip, and output a first non-continuous signal to the port pin according to the state signal, wherein the state signal is a continuous signal;

the port pin is configured to output the first non-continuous signal and receive a second non-continuous signal in response to the first non-continuous signal in an interval period of the first non-continuous signal; and the controller is also configured to receive the second non-continuous signal from the port pin, and control the power supply to supply power according to the second non-continuous signal.

Some embodiments of this disclosure provide another optical module, including: a memory storing computer readable programs and a processor, wherein the processor executes the computer readable program to:

receive a state signal from an optical chip of the optical module, and outputting a first non-continuous signal to a port pin of a port of the optical module according to the state signal, wherein the state signal is a continuous signal;

enable the port pin to output the first non-continuous signal and enable the port pin to receive a second non-continuous signal coming from the port and in response to the first non-continuous signal in an interval period of the first non-continuous signal; and control a power supply of the optical module to supply power according to the second non-continuous signal.

Some embodiments of this disclosure further provide a method for controlling optical module, and the control method includes the following steps:

receiving a state signal of an optical chip of an optical module, the state signal is a continuous signal;

outputting a first non-continuous signal to a port pin of a port of the optical module according to the state signal;

receiving a second non-continuous signal sent by the port pin, wherein the second non-continuous signal is received by the port pin in an interval period of the first non-continuous signal and is in response to the first non-continuous signal; and controlling a power supply of the optical module to supply power according to the response signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In order to realize that the optical module reports abnormal state information to a system, an external port will be usually configured at the optical module side, for example, a LOS output port, or a FAULT output port, but these external ports only have a function of outputting a state signal to the system.

For example, in general, after outputting a LOS signal or a FAULT signal, the optical module does not require power shut treatment. Thus, a LOS output port (LOS pin) of the optical module only has a function of outputting a LOS signal and does not have a function of responding to a power shut instruction. In the prior art, the system reads a LOS state of the optical module through the LOS pin of the optical module, and the LOS state includes a LOS-ASSERT (usually configured as a high level) state, or a LOS-DEASSERT (usually configured as a low level) state.

Figure 1A:
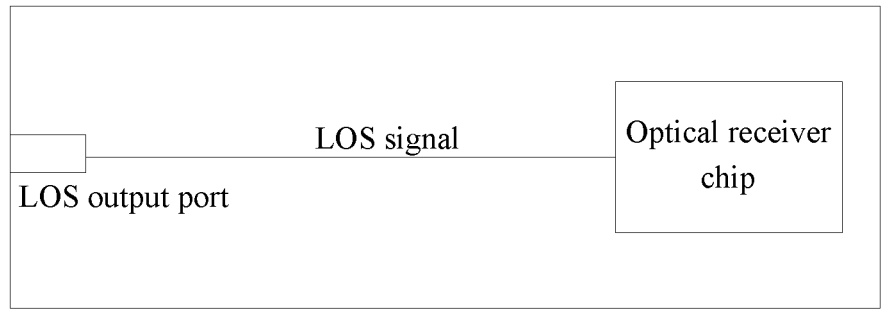
FIGS. 1A-2B are structural schematic diagrams for a port output mode, provided in the prior art.

A receiver chip in the optical module outputs the LOS state directly through a LOS output port. For example, as shown in FIG. 1A, a LOS signal of the receiver chip (RECEIVER CHIP) is output directly from the LOS output port.

Figure 1B:
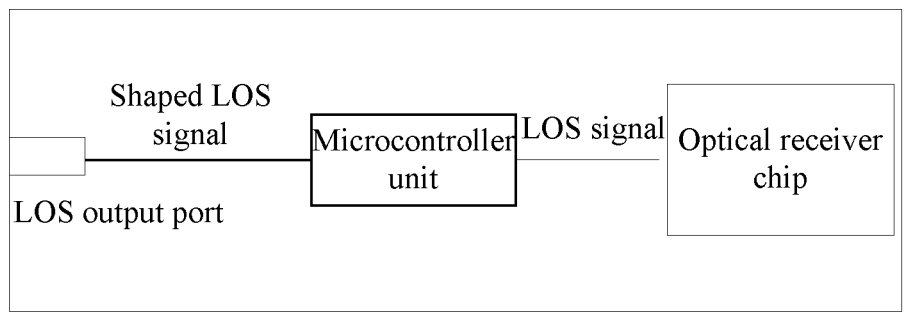

In order to ensure the quality of the LOS signal, the LOS signal may be also shaped by a MCU at first, and then the shaped LOS signal is output through the LOS output port. For example, as shown in FIG. 1B, the LOS signal of the receiver chip is shaped by a controller (MCU), and then is output through the LOS output port of the module. The LOS output port in the optical module can only output a LOS signal but cannot receive a response instruction of the system to the LOS signal.

For another example, a transmitter chip of the module outputs a FAULT state through a FAULT output port, and after outputting a FAULT signal, the module does not require power shut treatment.

Figure 2A:
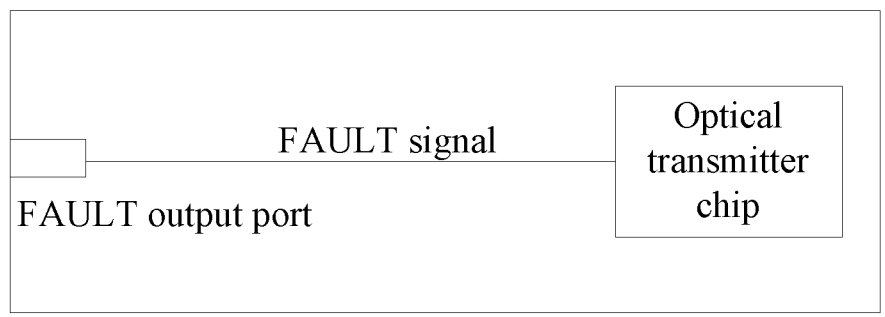
Figure 2B:
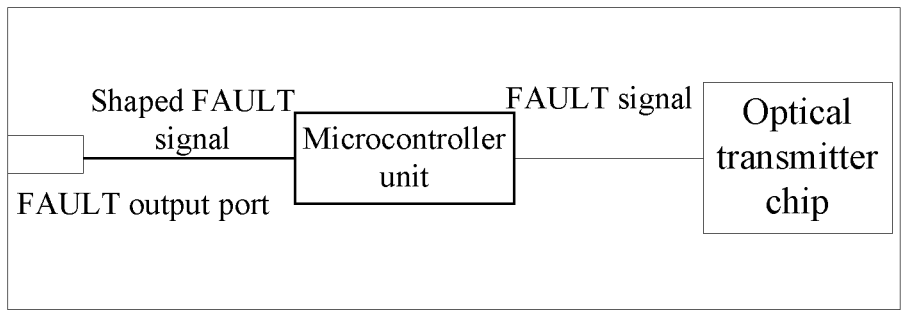

As shown in FIG. 2A, the reporting of the FAULT signal is realized through a FAULT output port, and a FAULT signal of a transmitter chip (LD CHIP) is output directly through the FAULT output port. As shown in FIG. 2B, the FAULT signal of the transmitter chip (LD CHIP), after being shaped by the MCU, is output through the FAULT output port. Therefore, the FAULT output port can only output a FAULT signal but cannot receive a response instruction of the system to the FAULT signal.

Some customers require addition of some functions when a LOS signal appears, for example, for the LOS signal, a power shut instruction is executed to the receiver chip or to the entire module; for the FAULT signal, a power shut instruction is executed to the transmitter chip, or to the entire module. However, the configured number of pins of the optical module usually is fixed. For an optical module product, in the case of complying with any protocol, the pin definition of the module is fixed, i.e., the configured functions and the configured number of the pins are fixed, and when all the configured pins are used, there is no idle pin to implement a newly-added function of the module; and if a certain function of the module needs to be added, some ports that are being used need to be multiplexed for getting matched with a system so as to realize a certain function that is newly added. For example, a STICK type SFP optical module subject to a 8472 pin definition does not have an additional available pin. When a new function needs to be added, there is no unoccupied pin for use.

However, not all defined pins in the module can be multiplexed, only those that meet a certain condition can be multiplexed, and these pins that can be multiplexed generally define digital signals with a long variation period of high and low levels, i.e., the duration that a state signal output by a pin stays at a high level or the duration that a state signal output by a pin stays at a low level, thus, when the state signal is switched from the low level to the high level or from the high level to the low level, the pin may be multiplexed for the new function by using the long period of the high level or the low level. For example, a pin originally defined for a function A may be defined for a function B, and this multiplexed pin executes the function B while not executing the function A.

The LOS output port (LOS pin) of the optical module meets this condition for reuse. For example, a LOS signal output by the LOS output port usually is a low-level signal and can be a high-level signal only under an abnormal condition of light loss, and the period between the low-level signal and the high-level signal is relatively long. In the optical module, when the receiver chip finds that front end light is less than a LOS threshold, it will send a LOS-ASSERT alarm, and the LOS-ASSERT state of the LOS pin of the receiver chip is usually a high level; and when the front end light changes from being less than the alarm threshold to being greater than the alarm threshold and exceeds a DEASSERT threshold set by the chip, the receiver chip will return to the LOS-DEASSERT state, and the LOS-DEASSERT state of the LOS pin of the receiver chip is usually a low level. The LOS state will be output to the system through the LOS output port (LOS pin) of the optical module, the system only read the states of the optical module at this LOS pin, but the optical module keeps one of the states for a long time without keeping the output to an external system; therefore, the output to the external system may be stopped for a short time during the time when the optical module keeps one of the states, but an input signal is received from the external system, and when the input signal is completely received, the output to the external system is recovered. Correspondingly, the external system, during the time when the optical module stops outward output for a short time, automatically keeps the previously received state. During this short stop time, the optical module does not output a signal outwards, but the external system automatically keeps the previously received state, for example, the high level received from the optical module previously; and during this short stop time, the external system automatically keeps the high-level state, and then obtains a signal from the optical module in real time after the stop time.

In the prior art, the state signal of the optical module is a continuous signal and the outward output occurs all the time. However, in this solution, the continuous signal is modified into a non-continuous signal, the external system automatically keeps its state in an interval period of the non-continuous signal and receives an input signal in a short stop time, so that original properties are not influenced, and a new function may be added.

For the same reason, the FAULT output port (FAULT pin) of the optical module also meets the abovementioned condition for reuse.

When the optical module needs to report an abnormal state to the system and receive an instruction for processing this abnormal state from the system, the LOS pin or the FAULT pin needs to be multiplexed to enable the optical module to receive and respond to a power shut instruction of the system. For example, a loss of signal (LOS) appears at a receiving end of the optical module, and equipment enters a LOS state. After the equipment enters the LOS state, under an ideal condition, a power shut instruction of a transmitting end (TX-POWER SHUT) will be affected, and then the transmitting end is powered off; and for another example, after a fault state (FAULT) appears at the transmitting end of the optical module and the system responds to a FAULT signal, and under an ideal condition, the system will correspond to a RX-POWER SHUT power shut instruction to power off the receiving terminal.

In order to achieve the abovementioned functions of the optical module, some embodiments of this disclosure provide a port solution of optical module to achieve new functions of the module by reusing existing ports meeting a reuse condition in the optical module. These ports meeting the reuse condition are ports that can be multiplexed, for example, the ports that can be multiplexed need to meet the condition that: the initially defined period of alternation between high and low levels for the port to transmit a digital signal is relatively long. A port of which the duration of staying at a high level or a low level of a state signal meets a predetermined duration is configured as a port that can be multiplexed. As the period for alternation between the high and low levels of the state signal transmitted by the port that can be multiplexed is relatively long, it is possible to set aside a time gap for reusing the port in a duration that the state signal output by the port that can be multiplexed stays at the high level or the low level, thereby enabling the port to have a new function. Supposing that the original function of the port that can be multiplexed is function A, the port has function B. If there is a functional connection between the function B and the function A, the function B can partially replace the function A. Or, the port has both the function A and the function B, and the function A and the function B may be enabled alternately. In a word, the port in embodiments of this disclosure is obtained after reconfiguration of an existing port meeting the condition for reusing in the optical module.

Figure 3:
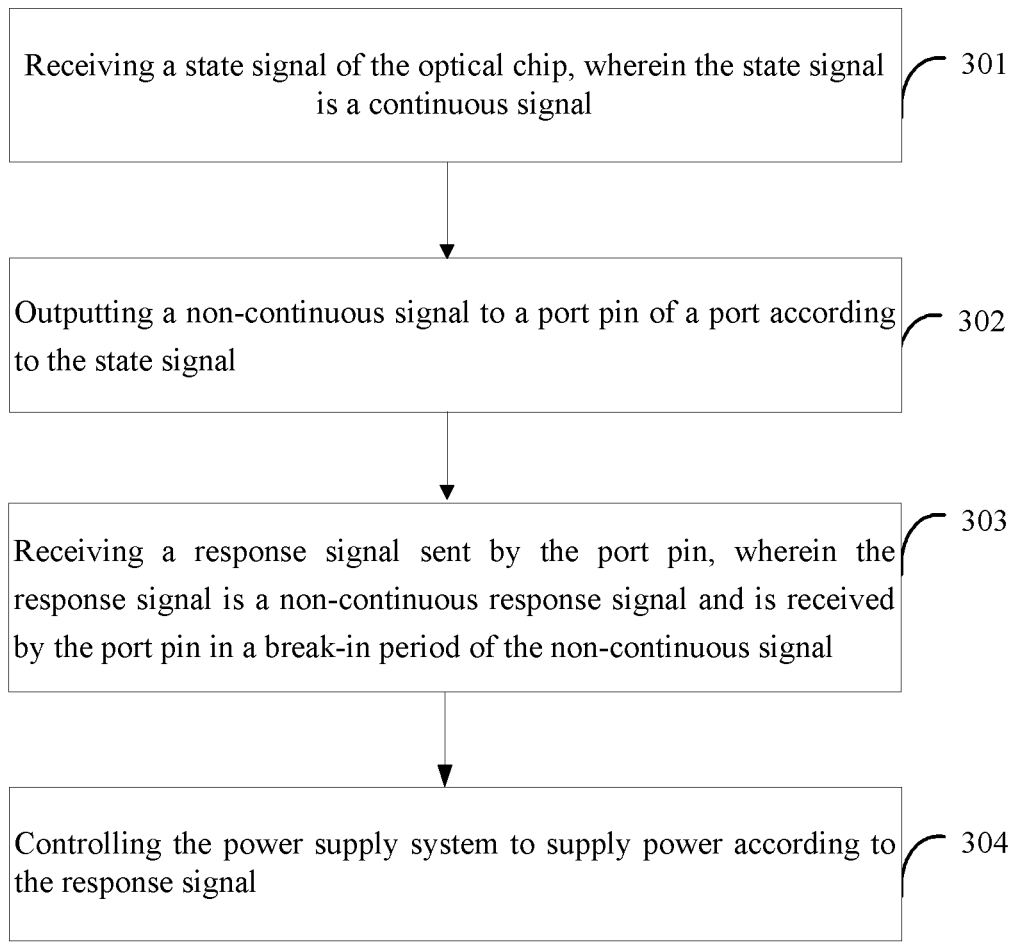
FIG. 3 is a method flow diagram of a method for controlling optical module, according to some embodiments of this disclosure.

Based on the above inventive concept of this disclosure, as shown in FIG. 3, some embodiments of this disclosure provide a method for controlling optical module, and the method includes:

step 301, receiving a state signal of an optical chip, the state signal is a continuous signal;

step 302, outputting a non-continuous signal (first non-continuous signal) to a port pin of a port according to the state signal;

step 303, receiving a response signal sent by the port pin, the response signal is a non-continuous response signal (second non-continuous signal) received by the port pin in an interval period of the first non-continuous signal; and step 304, controlling a power supply to supply power according to the response signal.

The above method flow may be executed by a controller in the optical module. The optical chip, the port and the power supply are electrically connected with the controller, and the controller controls the power supply at a transmitting end or a receiving end to supply power according to the received response signal.

The above state signal refers to a continuous signal of periodic switching of a first level and a second level, and in a switching period of the first level and the second level, the state signal stays at the first level for at least 100 nS and the second level for at least 100 nS. The first level is a high level, and the second level is a low level; or the first level is a low level, and the second level is a high level.

In the step 302, before transmitting non-continuous signal to the port pin, the controller further processes the received state signal to obtain a non-continuous signal. For example, after the controller receives the state signal, an interval period of a predetermined duration is set on the first level or the second level in the state signal to form a non-continuous signal.

Figure 6A:
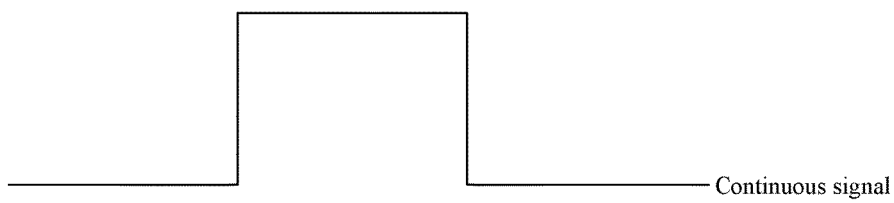
FIGS. 6A-6D are timing sequences for controlling switching of input and output states of a pin 1 by a controller according to some embodiments of this disclosure.
Figure 6A:
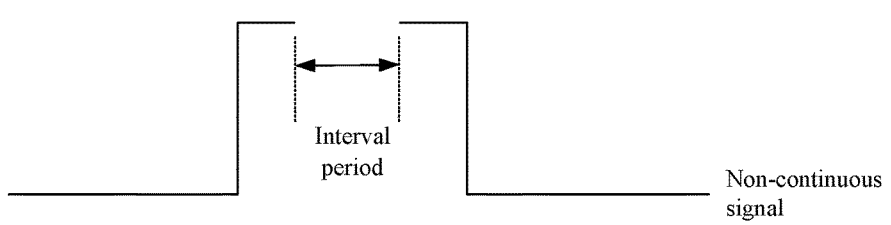

For the non-continuous signal in FIG. 6A, an interval period is set on a high level of the state signal (continuous signal) to serve as an interval period of the non-continuous signal, and the intervals excepts the interval period in the duration within which the continuous signal stays at the high level are used as a continuous period of the non-continuous signal. Optionally, the non-continuous signal in FIG. 6C may further include an interval period on a low level except an interval period on a high level, and the controller only needs to set an interval period in a duration within which the continuous signal stays at the high level and also set an interval period in a duration within which the continuous signal stays at the low level.

Before the step 302, i.e., before outputting a non-continuous signal to the port pin, the controller processes a continuous signal into the non-continuous signal includes:

mode I, when the state signal is switched from a first level to a second level, setting an interval of a predetermined duration on the duration that the state signal stays at the second level to form the non-continuous signal;

mode II, when the state signal is switched from the second level to the first level, setting an interval of a predetermined duration on the duration within which the state signal stays at the first level to form the non-continuous signal; and mode III, when the state signal is switched from the first level to the second level, setting an interval of a first predetermined duration on the duration within which the state signal stays at the second level, and when the state signal is switched from the second level to the first level, setting an interval of a second predetermined duration on the duration within which the state signal stays at the first level to form the non-continuous signal, wherein the first predetermined duration may be equal to the second predetermined duration, and the first predetermined duration may not be equal to the second predetermined duration.

In some embodiments, the controller includes a first pin, a second pin and a third pin; the optical chip is electrically connected with the second pin, and the port pin is electrically connected with the first pin; and the power supply is electrically connected with the third pin.

The second pin is configured to be in an input state, thus, in the step 301, the controller receives a state signal of the optical chip through the second pin.

The third pin is configured to be in an output state, thus, in the step 304, the controller controls the power supply to supply power through the third pin according to the received response signal.

The state of the first pin includes an input state and an output state which are switched alternately. The switching of the input state and the output state is controlled according to the non-continuous signal.

In the step 302, outputting the non-continuous signal to the port pin by the controller includes:

after processing the received state signal into a non-continuous signal, switching the first pin to the output state in a continuous period of the non-continuous signal to enable the first pin to output the non-continuous signal to the port pin.

In the step 303, receiving the response signal sent by the port pin by the controller includes:

switching the first pin to an input state in an interval period of the non-continuous signal to enable the first pin to receive a response signal.

Taking the first level being a low level and the second level being a high level as an example, after the controller receives a non-continuous response signal, the above method further includes the following processing modes:

A first processing mode: refer to FIG. 6A, if the controller processes a continuous signal into a non-continuous signal according to the above mode I, i.e., the interval of the non-continuous signal is set in a second level interval, after receiving the non-continuous response signal (at that moment, the state signal still stays at the second level or is just switched to the first level), the method further includes: switching the state of the first pin to an output state to enable the first pin to output the state signal to the port pin until the state signal is switched from the first level to the second level again, and returning to the step 301 to the step 304.

Figure 6B:
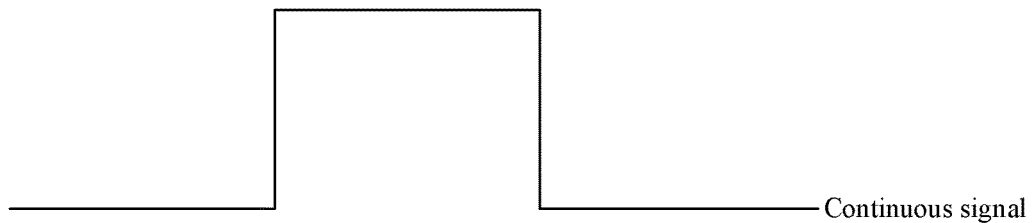
Figure 6B:
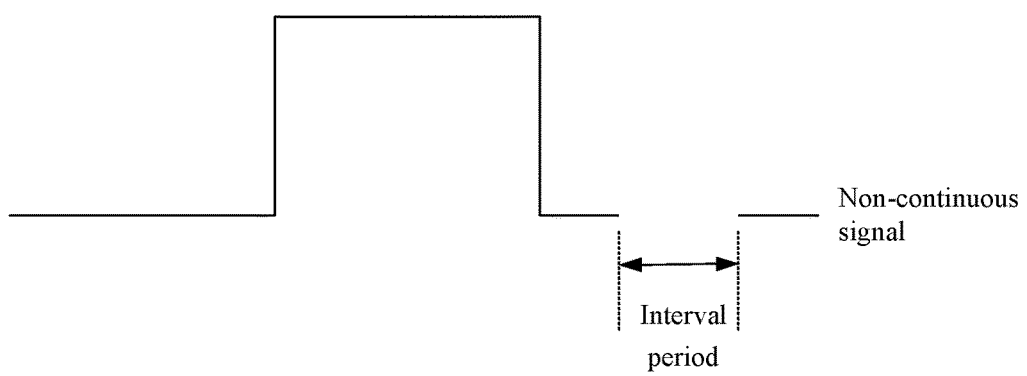

A second processing mode: refer to FIG. 6B, if the controller processes a continuous signal into a non-continuous signal according to the above mode II, i.e., the interval of the non-continuous signal is set in a first level interval, after receiving the non-continuous response signal (at that moment, the state signal still stays at the first level or is just switched to the second level), the method further includes: switching the state of the first pin to an output state to enable the first pin to output the state signal to the port pin until the state signal is switched from the second level to the first level again, and returning to the step 302 to the step 304.

Figure 6C:
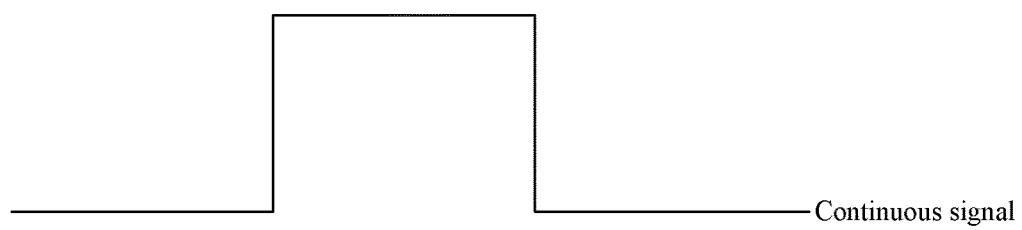
Figure 6C:
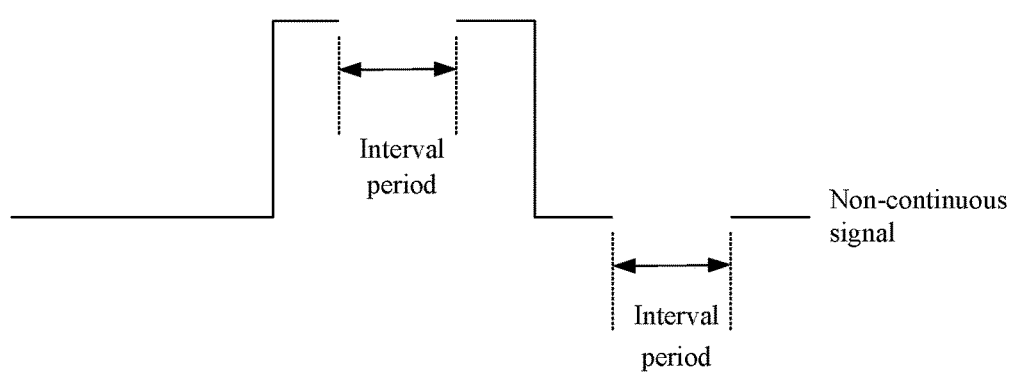

A third processing mode: if the controller processes a continuous signal into a non-continuous signal according to the above mode III, i.e., there are two interval periods of the non-continuous signal in an alternate period, one is set in the first level interval and the other is set in the second level interval, and refer to FIG. 6C, after receiving the non-continuous response signal, the method further includes: if the state signal still stays at the second level, switching the state of the first pin to an output state to enable the first pin to output the second level of the state signal until the second level is switched to the first level, and returning to the step 302 to the step 304; and if the state signal still stays at the first level, switching the state of the first pin to an output state to enable the first pin to output the first level of the state signal to the port pin until the state signal is switched from the first level to the second level, and returning to the step 302 to the step 304.

In the process of the above implementation, the controller controls the switching of the input state and the output state of the first pin according to the non-continuous signal, and it may include two methods:

A first method: if the state signal stays at the first level and the second level for the same time, and the continuous period of the non-continuous signal is equal to the interval period of the non-continuous signal, an interval period is set on each of the first level and the second level of the non-continuous signal, the controller monitors level changes of the state signal, and the input state and the output state are periodically switched by setting a timer.

Figure 6D:
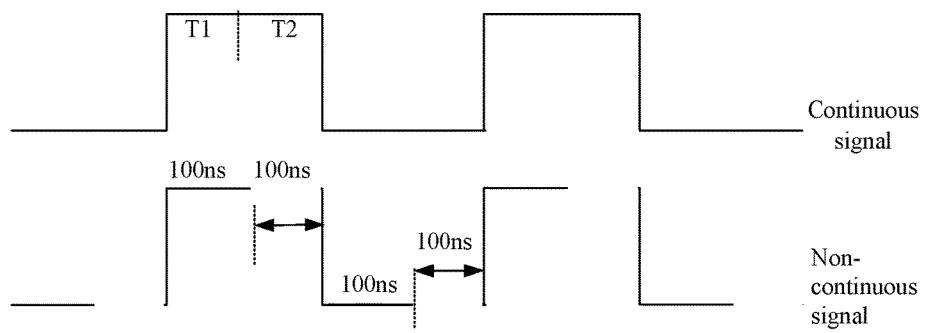

For example, refer to FIG. 6D, the state signal stays at the first level for 200 ns and stays at the second level for 200 ns, the continuous period for processing the state signal into a non-continuous signal is 100 ns, the interval period for processing the state signal into a non-continuous signal is 100 ns, and an interval period is set on each of the first level and the second level of the non-continuous signal, so that after the controller receives the state signal, the state of the first pin is controlled as an output state in the first 100 ns, the state of the first pin is controlled as an input state in the second 100 ns, the state of the first pin is controlled as an output state in the third 100 ns, and the state of the first pin is controlled as an input state in the fourth 100 ns.

A second method: the input state and the output state are not switched periodically, but when level changes of the state signal is monitored, an input instruction or an output instruction is sent to the controller to enable the controller to switch the input state and the output state.

For example, the controller receives a state signal of the optical chip, and in one switching period, when the state signal stays at the first level (for example, a low level), the controller is always in an output state; when the state signal is switched from the first level to the second level, the controller processes the state signal into a non-continuous signal, and enables an interval period of the non-continuous signal to be an interval set on the duration within which the state signal stays at the second level, and then the non-continuous signal is output outwards through the port pin; and after monitoring the non-continuous signal, in the interval period of the non-continuous signal, the external system responds to an input command to the controller and sends a non-continuous response signal through the port pin at the same time to enable the controller to switch the first pin from an output state to an input state according to the input command in an interval period of the non-continuous signal, and the first pin receives a response signal through the port pin. In this case, in the duration that the state signal stays at the second level, the controller processes the state signal into a non-continuous signal and ensures that the interval period of the non-continuous signal includes the time when an external system responds to the non-continuous signal.

In the above method flow, the port is a LOS port of an optical receiver chip, and a LOS state includes a LOS-ASSERT state and a LOS-DEASSERT state; according to regulations of a protocol, the LOS-ASSERT state of the LOS port of the optical receiver chip is configured as a high-level signal, and the LOS-DEASSERT state is configured as a low-level signal, in that way, the optical receiver chip usually sends a low-level signal and sends a high-level signal only under an abnormal condition with light loss. Therefore, the state signal sent by the optical receiver chip is a continuous state signal with alternate high and low levels, the optical receiver chip is in the LOS-ASSERT state when the state signal has a high level, and the optical receiver chip is in the LOS-DEASSERT state when the state signal has a low level.

In a special case, for example, for an ONU type module, the LOS-ASSERT state may be configured as a low-level signal, and the LOS-DEASSERT state may be configured as a high-level signal.

In that way, the state signal in the above method flow is a state signal of a LOS port of the optical receiver chip, and when the state signal is at a high level, the controller controls the power supply to power off the optical transmitter chip according to a received response signal. Optionally, when the state signal is at a low level, the controller controls the power supply to power on the optical transmitter chip according to the received response signal.

In the above method flow, the port may also be a FAULT port of the optical transmitter chip, and a FAULT state includes a FAULT-ASSERT state and a FAULT-DEASSERT state. According to regulations of a protocol, the FAULT-ASSERT state of the FAULT port of the optical transmitter chip is configured as a high-level signal, and the FAULT-DEASSERT state is configured as a low-level signal, in that way, the optical transmitter chip usually sends a low-level signal and sends a high-level signal only under an abnormal condition with light loss. Therefore, the state signal sent by the optical transmitter chip is a continuous state signal with alternate high and low levels, the optical transmitter chip is in the FAULT-ASSERT state when the state signal has a high level, and the optical transmitter chip is in the FAULT-DEASSERT state when the state signal has a low level.

In a special case, for example, for an ONU type module, the FAULT-ASSERT state may be configured as a low-level signal, and the FAULT-DEASSERT state may be configured as a high-level signal.

In that way, the state signal in the above method flow is a state signal of a FAULT port of the optical transmitter chip, and when the state signal is at a high level, the controller controls the power supply to power off the optical transmitter chip according to a received response signal. Optionally, when the state signal is at a low level, the controller controls the power supply to power on the optical transmitter chip according to the received response signal.

In optical communication, two ends connected by optical fibers realize communication, and when one party stops communication, continuous communication performed by the other party does not have a practical meaning, which means that when the optical transmitter chip of one party stops sending information, the optical receiver chip of the other party cannot receive an optical signal and sends a LOS signal, and the optical transmitter chip of the other party has no need to continuously send information, at this moment, the work of the optical transmitter chip of the other party may be stopped.

When the optical transmitting chip of one party goes wrong, although the optical receiver chip of the other party still can receive light, the information is wrong, and the optical transmitter chip of the other party still has no need to work continuously and may stop working.

An optical module according to some embodiments of this disclosure includes:

a receiving unit configured to receive a state signal from an optical chip, the state signal is a continuous signal;

a processing unit configured to generate a non-continuous signal (i.e. a first non-continuous signal) according to the continuous signal;

an output-input unit configured to output the non-continuous signal, and receiving a non-continuous response signal (i.e. a second non-continuous signal) in an interval period of the non-continuous signal;

the processing unit is further configured to generate a control signal according to the response signal; and a control unit configured to control power supply according to the control signal.

In the above method flow, the states of three pins of the controller are configured, and the switching between the input state and the output state of the first pin is directly or indirectly controlled through the MCU, so that a function of reporting the state signal of the optical chip to the system is realized, and a response signal, for example, a power shut instruction of the system can be transmitted to the power supply in the optical module.

Figure 4:
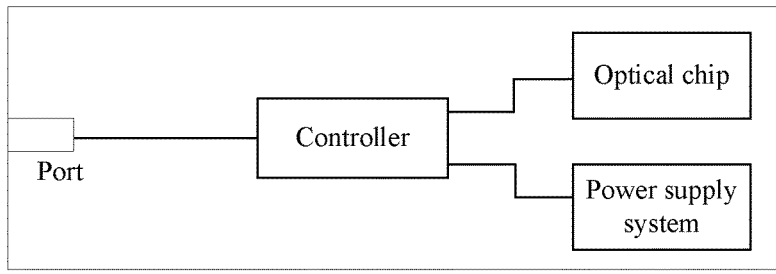
FIGS. 4-5 are structural schematic diagrams for an optical module according to some embodiments of this disclosure.

Based on the above method flow, the optical module according to some embodiments of this disclosure, as shown in FIG. 4, includes a port, a controller, an optical chip, and a power supply, wherein the port is configured with a port pin and the controller is configured to carry out the above method flow.

The optical chip is configured to input a state signal of the optical chip to the controller, wherein the state signal is a continuous signal;

the controller is configured to output a non-continuous signal to the port pin according to the state signal;

the port pin is configured to output the non-continuous signal outwards, and receiving a non-continuous response signal in an interval period of the non-continuous signal; and the controller is further configured to receive the response signal from the port pin, and control the power supply to supply power according to the response signal.

The above state signal refers to a continuous signal of periodic switching between a first level and a second level, and in one switching period of the first level and the second level, the state signal stays at the first level for at least one 100 nS, and stays at the second level for at least 100 nS. The first level is a high level, and the second level is a low level; or the first level is a low level, and the second level is a high level.

Before transmitting the non-continuous signal to the port pin, the controller is further configured to process the received state signal to obtain the non-continuous signal.

Processing the continuous signal into the non-continuous signal by the controller includes the following modes:

mode I, when the state signal is switched from a first level to a second level, setting an interval of a predetermined duration on a duration within which the state signal stays at the second level to form the non-continuous signal;

mode II, when the state signal is switched from the second level to the first level, setting an interval of a predetermined duration based on a duration within which the state signal stays at the first level to form the non-continuous signal; and mode III, when the state signal is switched from the first level to the second level, setting an interval of a first predetermined duration based on a duration within which the state signal stays at the second level, and when the state signal is switched from the second level to the first level, setting an interval of a second predetermined duration based on a duration within which the state signal stays at the first level to form the non-continuous signal, wherein the first predetermined duration may be equal to the second predetermined duration, and the first predetermined duration may not be equal to the second predetermined duration.

In some embodiments, the controller includes a first pin, a second pin and a third pin; the optical chip is electrically connected with the second pin, the port pin is electrically connected with the first pin, and the power supply is electrically connected with the third pin; the state of the first pin includes an input state and an output state which are switched alternately; the second pin is configured as an input state, and the controller receives a state signal of the optical chip through the second pin; and the third pin is configured as an output state, and the controller controls the power supply to supply power through the third pin according to the received response signal.

The controller is configured to:

switching the first pin to an output state in a continuous period of the non-continuous signal to enable the first pin to output a non-continuous signal to the port pin; or switching the first pin to an input state in an interval period of the non-continuous signal to enable the first pin to receive a response signal.

After receiving the response signal, the controller is further configured to:

switch the state of the first pin to an output state to enable the first pin to output a state signal to the port pin. Optionally, refer to FIG. 6A, if the controller processes a continuous signal into a non-continuous signal according to the above mode I, i.e., the interval of the non-continuous signal is set in a second level interval, then after receiving the non-continuous response signal (at that moment, the state signal still stays at the second level or is just switched to the first level), further including: switching the state of the first pin to an output state to enable the first pin to output the state signal to the port pin.

Optionally, refer to FIG. 6B, if the controller processes a continuous signal into a non-continuous signal according to the above mode II, i.e., the interval of the non-continuous signal is set in a first level interval, then after receiving the non-continuous response signal (at that moment, the state signal still stays at the first level or is just switched to the second level), further including: switching the state of the first pin to an output state to enable the first pin to output the state signal to the port pin.

Optionally, if the controller processes a continuous signal into a non-continuous signal according to the above mode III, i.e., there are two interval periods of the non-continuous signal in an alternate period, one is set in the first level interval and the other is set in the second level interval, and refer to FIG. 6C, after receiving the non-continuous response signal, further including: if the state signal still stays at the second level, switching the state of the first pin to an output state to enable the first pin to output the second level of the state signal; and if the state signal still stays at the first level, then switching the state of the first pin to an output state to enable the first pin to output the first level of the state signal to the port pin.

Based on the above optical module structure, some embodiments of this disclosure provide two types of controllers that can control the switching between the input state and the output state of the first pin.

The controller of the first type can control the input state and the output state of the first pin to be periodically switched.

In the controller of the second type, the first pin is set as an input state according to a received input instruction, and the first pin is switched to an output state according to an output instruction.

In the above optical module, the states of three pins of the controller are configured, and the switching between the input state and the output state of the first pin is controlled directly or indirectly through the MCU in a continuous period and an interval period of the non-continuous signal, so that a function of reporting the state signal of the optical chip to the system is realized, and a response signal, for example, a power shut instruction of the system can be transmitted to the power supply in the optical module.

Based on the above optical module, this disclosure is described in detail in conjunction with some embodiments.

Figure 5:
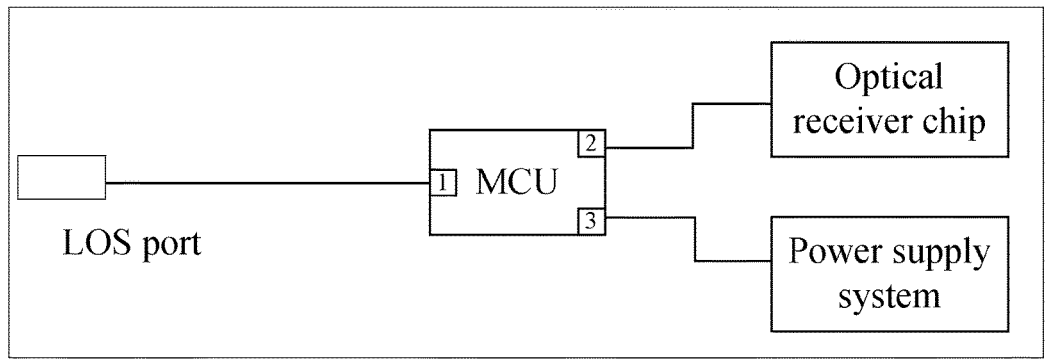

FIG. 5 exemplarily shows an optical module according to some embodiments of this disclosure, a port of the optical module is a LOS port, and as shown in FIG. 5, the optical module mainly includes: a LOS port, a MCU, an optical receiver chip and a power supply, wherein the MCU has three pins: a pin 1, a pin 2 and a pin 3, which correspond to the first pin, the second pin and the third pin in the above embodiments, respectively.

The connected relation between the three pins of the MCU and the LOS port, the optical receiver chip and the power supply is as follows: the pin 1 is electrically connected with a port pin of the LOS port, the pin 2 is electrically connected with the optical receiver chip, and the pin 3 is electrically connected with the power supply.

The pin 1 is configured with an input state and an output state, and the MCU controls periodic switching of the input state and the output state of the pin 1. A uplink transmission channel is formed when the pin 1 is in connection with the pin 2, and a downlink transmission channel is formed when the pin 1 is in connection with the pin 3. When the pin 1 is in the output state, the uplink transmission channel formed between the pin 1 and the pin 2 is opened, and the downlink transmission channel formed between the pin 1 and the pin 3 is closed; and when the pin 1 is in the input state, the downlink transmission channel formed between the pin 1 and the pin 3 is opened, and the uplink transmission channel formed between the pin 1 and the pin 2 is closed.

In conjunction with FIG. 6D, the high level and the low level of the state signal are switched once every 200 nS, and the periodic switching of the input state and the output state of the pin 1 includes: the pin 1 is in the output state in the first 100 nS (T1) of each period, and is in the input state in the last 100 nS (T2) of each period. Correspondingly, when the continuous signal is switched from a low level to a high level and switched from the high level to the low level, the state signal is processed into a non-continuous signal by the processor, the continuous period of the non-continuous signal is the first 100 nS of each period, and the interval period is the last 100 nS of each period.

The pin 2 is configured as an input state and is configured to receive a state signal sent by the optical receiver chip.

The port is a LOS port of the optical receiver chip. A LOS state output by the LOS port includes a LOS-ASSERT state and a LOS-DEASSERT state. According to regulations of a protocol, for the LOS port of the optical receiver chip, the LOS-ASSERT state is configured as a high-level signal, and the LOS-DEASSERT state is configured as a low-level signal, in that way, the optical receiver chip usually sends a low-level signal and sends a high-level signal only under an abnormal condition with light loss. Therefore, the state signal sent by the optical receiver chip is a continuous state signal with alternate high and low levels, the optical receiver chip is in the LOS-ASSERT state when the state signal has a high level, and the optical receiver chip is in the LOS-DEASSERT state when the state signal has a low level.

The pin 3 is configured as an output state and is configured to send a control instruction to the power supply to control the power supply to supply power to the optical transmitter chip. The control instruction is a power shut instruction or a power on instruction, and according to a protocol, the power shut instruction (POWER SHUT signal) is usually configured as a high-level signal, and the power on instruction (POWER ON signal) is configured as a low-level signal. Certainly, the protocol may also stipulate that: the POWER SHUT signal is configured as a low-level signal, and the POWER ON signal is configured as a high-level signal.

Hereinafter, the LOS-ASSERT state being a high-level signal, the LOS-DEASSERT signal being a low-level signal, the POWER SHUT being a high-level signal and the POWER ON being a low-level signal are taken as an example to illustrate that the above optical module configures an existing LOS port, and controls the switching of the input state and the output state of the pin 1 to realize the switching of the uplink transmission channel and the downlink transmission channel, thus enabling the optical module to have a function of reporting a state signal of the optical receiver chip to the system, and transmitting a response signal of the system into the optical module.

For example, in the first 100 nS, the MCU switches the state of the pin 1 to an output state, and meanwhile, opens the uplink transmission channel between the pin 1 and the pin 2 and closes the downlink transmission channel between the pin 1 and the pin 3, at this moment, if the optical receiver chip is in the LOS-ASSERT state, i.e., the intensity of an optical signal received by the optical receiver chip is lower than a set LOS-ASSERT threshold value, then the state signal sent by the optical receiver chip to the pin 2 of the MCU is a high-level signal. The MCU processes the received high-level signal into a high-level non-continuous signal which is input to the pin 1 through the uplink transmission channel between the pin 1 and the pin 2, and is output to the LOS port by the pin 1, and then the LOS port sends this high-level non-continuous signal to a main system outside the optical module; and after responding to a high-level LOS-ASSERT signal, the main system sends the high-level non-continuous response signal to the LOS port, wherein the non-continuous response signal is a high-level POWER SHUT control signal and is configured to indicating the controller to carry out a POWER SHUT operation on the optical transmitter chip by the power supply.

In the second 100 nS, the MCU switches the state of the pin 1 to an input state, and meanwhile, closes the uplink transmission channel between the pin 1 and the pin 2 and opens the downlink transmission channel between the pin 1 and the pin 3, a response signal received by the LOS port is input to the pin 1, the controller controls the pin 1 to transmit the high-level POWER SHUT control signal to the pin 3 through the downlink transmission channel according to the response signal received by the pin 1, the pin 3 outputs the POWER SHUT control signal to the power supply, and the power supply powers off the optical transmitter chip according to the POWER SHUT control signal.

At this moment, the output state of the pin 3 is kept as a high-level state until the pin 1 is in the input state again, and when the low-level signal is received, the output state of the pin 3 is changed into a low-level state, i.e., only when the pin 1 is changed in the input state in comparison with the previous period, the output state of the pin 3 is changed. In a word, the output state of the pin 3 is a continuous output state, and the pin 3 keeps outputting the state transmitted from the pin 1 until the high-level signal transmitted by the pin 1 to the pin 3 is changed into a low-level signal.

In the third 100 nS, the MCU switches the input state of the pin 1 to an output state, and meanwhile, opens the uplink transmission channel between the pin 1 and the pin 2 and closes the downlink transmission channel between the pin 1 and the pin 3, at this moment, if the optical receiver chip will return to the LOS-DEASSERT state, (i.e., the intensity of an optical signal received by the optical receiver chip changes from being less than an alarm threshold to exceeding a DEASSERT threshold set by the chip), then the state signal sent by the optical receiver chip to the pin 2 of the MCU has a low level, the MCU processes the received low-level signal into a low-level non-continuous signal which is transmitted to the pin 1 through the uplink transmission channel and is output to the LOS port by the pin 1, and the LOS port sends the low-level non-continuous signal to a main system outside the optical module; after responding to a low-level LOS-DEASSERT signal, the main system sends the low-level non-continuous response signal to the FAULT port, and the low-level non-continuous response signal is a low-level POWER ON control signal which is configured to indicating the controller to carry out a POWER ON operation on the optical transmitter chip to the power supply.

In the fourth 100 nS, the MCU switches the output state of the pin 1 to an input state, and meanwhile, closes the uplink transmission channel between the pin 1 and the pin 2 and opens the downlink transmission channel between the pin 1 and the pin 3, a POWER ON response signal received by the LOS port is input to the pin 1, the pin 1 transmits a POWER ON control signal to the pin 3 through the downlink transmission channel, the pin 3 outputs the POWER ON control signal to the power supply, and the power supply powers on the optical transmitter chip according to the POWER ON control signal.

In the fifth 100 nS, the MCU switches the input state of the pin 1 to an output state, and the above processes are repeated.

Figure 7:
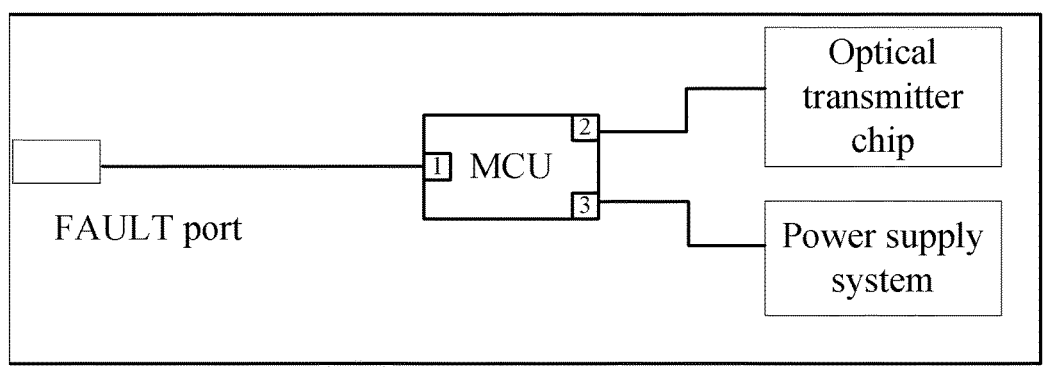
FIGS. 7-9 are structural schematic diagrams of an optical module according to some embodiments of this disclosure.

FIG. 7 exemplarily shows an optical module according to some embodiments of this disclosure. A port of the optical module is a FAULT port, and as shown in FIG. 7, the optical module mainly includes: a FAULT port, a MCU, an optical transmitter chip and a power supply, wherein the MCU has 3 pins: a pin 1, a pin 2 and a pin 3, which correspond to the first pin, the second pin and the third pin in the above embodiments, respectively.

The connected relation between the three pins of the MCU and the FAULT port, the optical transmitter chip and the power supply is as follows: the pin 1 is electrically connected with a port pin of the FAULT port, the pin 2 is electrically connected with the optical transmitter chip, and the pin 3 is electrically connected with the power supply.

The pin 1 is configured with an input state and an output state, and the MCU controls periodic switching of the input state and the output state of the pin 1. A uplink transmission channel is formed when the pin 1 is in connection with the pin 2, and a downlink transmission channel is formed when the pin 1 is in connection with the pin 3. When the pin 1 is in the output state, the uplink transmission channel between the pin 1 and the pin 2 is opened, and the downlink transmission channel between the pin 1 and the pin 3 is closed; and when the pin 1 is in the input state, the downlink transmission channel between the pin 1 and the pin 3 is opened, and the uplink transmission channel formed between the pin 1 and the pin 2 is closed.

In conjunction with FIG. 6D, the high level and the low level of the state signal are switched once every 200 nS, and the periodic switching of the input state and the output state of the pin 1 includes: the pin 1 is in the output state in the first 100 nS (T1) of each period, and is in the input state in the last 100 nS (T2) of each period. Correspondingly, when the continuous signal is switched from a low level to a high level and switched from the high level to the low level, the state signal is processed into a non-continuous signal by the processor, the continuous period of the non-continuous signal is the first 100 nS of each period, and the interval period is the last 100 nS of each period.

The pin 2 is configured as an input state and is configured to receive a state signal sent by the optical transmitter chip.

The port is a FAULT port of the optical transmitter chip. A FAULT state output by the FAULT port includes a FAULT-ASSERT state and a FAULT-DEASSERT state. According to regulations of a protocol, for the FAULT port of the optical transmitter chip, the FAULT-ASSERT state is configured as a high-level signal, and the FAULT-DEASSERT state is configured as a low-level signal, in that way, the optical transmitter chip usually sends a low-level signal and sends a high-level signal only under an abnormal condition with light loss. Therefore, the state signal sent by the optical transmitter chip is a continuous state signal with alternate high and low levels, the optical transmitter chip is in the FAULT-ASSERT state when the state signal has a high level, and the optical transmitter chip is in the FAULT-DEASSERT state when the state signal has a low level.

The pin 3 is configured as an output state and is configured to send a control instruction to the power supply according to a response signal to control the power supply to supply power to the optical transmitter chip. The control instruction is a power shut instruction or a power on instruction, and according to a protocol, the power shut instruction (POWER SHUT signal) is usually configured as a high-level signal, and the power on instruction (POWER ON signal) is configured as a low-level signal. Certainly, the protocol may also stipulate that: the POWER SHUT signal is configured as a low-level signal, and the POWER ON signal is configured as a high-level signal.

Hereinafter, the FAULT state being a high-level signal, the LOS-DEASSERT state being a low-level signal, the POWER SHUT signal being a high-level signal and the POWER ON signal being a low-level signal are taken as an example to illustrate that the above optical module configures an existing FAULT port, and controls the switching of the input state and the output state of the pin 1 to realize the switching of the uplink transmission channel and the downlink transmission channel, thus enabling the optical module to have a function of reporting a state signal of the optical chip to the system, and transmitting a response signal of the system to the power supply in the optical module.

For example, in the first 100 nS, the MCU switches the state of the pin 1 to an output state, and meanwhile, opens the uplink transmission channel between the pin 1 and the pin 2 and closes the downlink transmission channel between the pin 1 and the pin 3, at this moment, if the optical transmitter chip has a state error, then the optical transmitter chip is in the FAULT-ASSERT, and the state signal sent by the optical receiver chip to the pin 2 of the MCU is a high-level signal. The MCU processes the received high-level signal into a high-level non-continuous signal which is input to the FAULT port through the uplink transmission channel between the pin 1 and the pin 2, and then the FAULT port sends this high-level non-continuous signal to a main system outside the optical module; and after responding to a high-level FAULT signal, the main system sends a non-continuous response signal to the FAULT port, wherein the non-continuous response signal is a high-level POWER SHUT control signal and is configured to indicating the controller to carry out a POWER SHUT operation on the optical transmitter chip to the power supply.

In the second 100 nS, the MCU switches the state of the pin 1 to an input state, and meanwhile, closes the uplink transmission channel between the pin 1 and the pin 2 and opens the downlink transmission channel between the pin 1 and the pin 3, a response signal received by the FAULT port is input to the pin 1, the controller controls the pin 1 to transmit the POWER SHUT control signal to the pin 3 through the downlink transmission channel according to the response signal received by the pin 1, the pin 3 outputs the POWER SHUT control signal to the power supply, and the power supply powers off the optical transmitter chip according to the POWER SHUT control signal; and at this moment, the output state of the pin 3 is kept as a high-level state until the pin 1 is in the input state again, and when the low-level signal is received, the output state of the pin 3 is changed into a low-level state, i.e., the output state of the pin 3 is changed only when the input state of the pin 1 is changed in comparison with the previous time when the pin 1 is in the input state, the output state of the pin 3 is changed. In a word, the output state of the pin 3 is a continuous output state, and the pin 3 keeps outputting the state transmitted from the pin 1 until the high-level signal transmitted by the pin 1 to the pin 3 is changed into a low-level signal.

In the third 100 nS, the MCU switches the state of the pin 1 to an output state, and meanwhile, opens the uplink transmission channel between the pin 1 and the pin 2 and closes the downlink transmission channel between the pin 1 and the pin 3, at this moment, if the state of the optical transmitter chip returns to normal, then the optical transmitter chip will return to the FAULT-DEASSERT state, and the state signal sent by the optical transmitter chip to the pin 2 of the MCU has a low level; the MCU processes the received low-level signal into a low-level non-continuous signal which is transmitted to the pin 1 through the uplink transmission channel and is output to the FAULT port by the pin 1, and the FAULT port sends the low-level non-continuous signal to the main system outside the optical module; after responding to a low-level FAULT-DEASSERT signal, the main system sends the non-continuous response signal to the FAULT port, and the non-continuous response signal is a low-level POWER ON control signal which is configured to indicating the controller to carry out a POWER ON operation on the optical transmitter chip to the power supply.

In the fourth 100 nS, the MCU switches the output state of the pin 1 to an input state, and meanwhile, closes the uplink transmission channel between the pin 1 and the pin 2 and opens the downlink transmission channel between the pin 1 and the pin 3, a low-level response signal received by the FAULT port is input to the pin 1, the pin 1 transmits a POWER ON control signal to the pin 3 through the downlink transmission channel, the pin 3 outputs the POWER ON control signal to the power supply, and the power supply powers on the optical transmitter chip according to the POWER ON control signal.

In the fifth 100 nS, the MCU switches the input state of the pin 1 to an output state, and the above processes are repeated.

Figure 8:
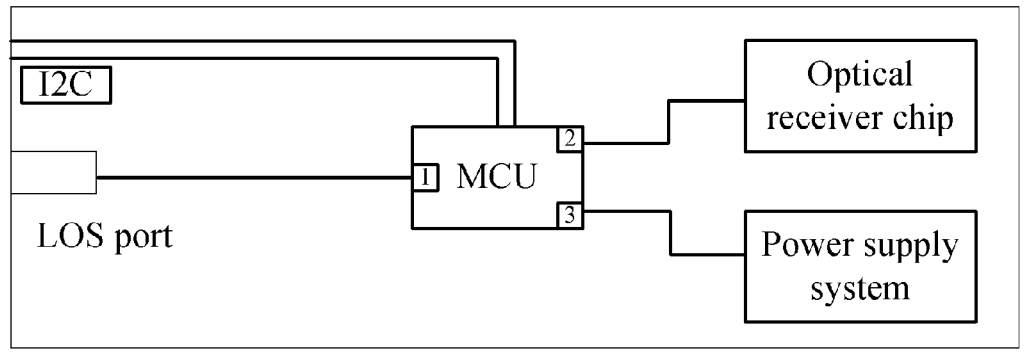

FIG. 8 exemplarily shows an optical module according to some embodiments of this disclosure, a port of the optical module is a LOS port, and as shown in FIG. 8, the optical module mainly includes: a LOS port, a MCU, an optical receiver chip, a power supply and an I2C bus interface, wherein the MCU has 3 pins: a pin 1, a pin 2 and a pin 3, which correspond to the first pin, the second pin and the third pin in the above embodiments, respectively.

The connected relation between the three pins of the MCU and the LOS port, the optical receiver chip and the power supply is as follows: the pin 1 is electrically connected with a port pin of the LOS port, the pin 2 is electrically connected with the optical receiver chip, and the pin 3 is electrically connected with the power supply.

The pin 1 is configured with an input state and an output state, and the I2C bus interface controls the output state of the pin 1 to be switched to the input state through the MCU. A uplink transmission channel is formed when the pin 1 is in connected with the pin 2, and a downlink transmission channel is formed when the pin 1 is in conduction with the pin 3. When the pin 1 is in the output state, the uplink transmission channel between the pin 1 and the pin 2 is opened, and the downlink transmission channel between the pin 1 and the pin 3 is closed; and when the pin 1 is in the input state, the downlink transmission channel between the pin 1 and the pin 3 is opened, and the uplink transmission channel formed between the pin 1 and the pin 2 is closed.

The pin 2 is configured as an input state and is configured to receive a state signal sent by the optical receiver chip.

The LOS port is a LOS port of the optical receiver chip.

The pin 3 is configured as an output state and is configured to send a control instruction to the power supply to control the power supply to supply power to the optical receiver chip. Hereinafter, the LOS-ASSERT being a high-level signal, the LOS-DEASSERT being a low-level signal, the POWER SHUT being a high-level signal and the POWER ON being a low-level signal are taken as an example to illustrate that the above optical module configures an existing LOS port as a LOS port, and controls the switching of the input state and the output state of the pin 1 to realize the switching of the uplink transmission channel and the downlink transmission channel, thus enabling the optical module to have a function of reporting a state signal of the optical receiver chip to the system, and transmitting a response signal of the system into the optical module.

At some point, the MCU receives an output command transmitted by the main system through the I2C bus interface, configures the state of the pin 1 as an output state according to the output command of the I2C bus interface, and meanwhile, opens the uplink transmission channel between the pin 1 and the pin 2 and closes the downlink transmission channel between the pin 1 and the pin 3, at this moment, if the state of the optical receiver chip is switched from the LOS-DEASSERT state to the LOS-ASSERT state, i.e., the state signal sent by the optical receiver chip to the pin 2 of the MCU is switched from a low level to a high level, then the MCU processes the high-level part of the state signal into a non-continuous signal which is input to pin 1 through the uplink transmission channel between the pin 1 and the pin 2, and is output to the LOS port by the pin 1, and then the LOS port sends this high-level non-continuous signal to the main system; and after responding to a LOS-ASSERT signal, the main system sends a non-continuous response signal to the LOS port in an interval period of the non-continuous signal, and sends an input instruction to the MCU through the I2C bus interface to command the MCU to switch the state of the pin 1 from the output state to an input state, wherein the non-continuous response signal is a high-level POWER SHUT control signal and is configured to indicating the controller to carry out a POWER SHUT operation on the optical receiver chip by the power supply.

The MCU receives an input instruction, switches the state of the pin 1 to an input state, closes the uplink transmission channel between the pin 1 and the pin 2, and opens the downlink transmission channel between the pin 1 and the pin 3, and at this moment, the non-continuous response signal received by the LOS port is input to the pin 1; and The MCU controls the pin 1 to transmit the POWER SHUT control signal to the pin 3 through the downlink transmission channel according to the non-continuous response signal received by the pin 1, the pin 3 outputs the POWER SHUT control signal to the power supply, and the power supply powers off the optical receiver chip according to the POWER SHUT control signal.

At this moment, the output state of the pin 3 keeps as a high-level state until the pin 1 is in an input state again (for example, the main system commands the pin 1 of the MCU to be switched to the input state again through I2C), and only when a low-level signal is received, the output state of the pin 3 is changed into a low-level state, i.e., the output state of the pin 3 is changed only when the input state of the pin 1 is changed in comparison with the previous time when the pin 1 is in the input state. In a word, the output state of the pin 3 is a continuous output state, and the pin 3 keeps outputting the state transmitted from the pin 1 until the high-level signal transmitted by the pin 1 to the pin 3 is changed into a low-level signal.

After the interval period of the non-continuous signal, i.e., after an input command is sent to the MCU and a non-continuous response signal is sent to the port, the main system sends an output command to the MCU again through the I2C interface to indicate the MCU to switch the input state of the pin 1 to an output state.

The MCU opens the uplink transmission channel between the pin 1 and the pin 2 and closes the downlink transmission channel between the pin 1 and the pin 3 according to the received output command. At this moment, the MCU continuously outputs the state signal of the optical receiver chip to the pin 1 until when the subsequent state of the optical receiver chip is switched from the LOS-DEASSERT state to the LOS-ASSERT state again, the state signal received by the MCU is switched from a low level to a high level again, then the MCU processes a high-level part of the state signal into a non-continuous signal, and the above processes are repeated.

In some embodiments, if the optical receiver chip returns from the LOS-ASSERT state to the LOS-DEASSERT state, i.e., the state signal received by the MCU is switched from a high level to a low level, the MCU processes the low-level part of the state signal into a low-level non-continuous signal, and inputs the low-level non-continuous signal to the pin 1 through the uplink transmission channel between the pin 1 and the pin 2, then the low-level non-continuous signal is output to the LOS port by the pin 1, and then the LOS port sends this low-level non-continuous signal to the main system; after responding to a LOS-DEASSERT signal, the main system sends the non-continuous response signal to the LOS port in an interval period of the non-continuous signal; an input instruction is sent to the MCU through the I2C bus interface to command the MCU to switch the output state of the pin 1 to an input state, wherein the low-level non-continuous response signal is a low-level POWER ON control signal which is configured to indicate the controller to carry out a POWER ON operation on the optical receiver chip to the power supply.

The MCU switches the output state of the pin 1 to an input state according to the received input instruction, closes the uplink transmission channel between the pin 1 and the pin 2 and opens the downlink transmission channel between the pin 1 and the pin 3, and at this moment, the non-continuous response signal received by the LOS port is input to the pin 1; and the MCU controls the pin 1 to transmit the POWER ON control signal to the pin 3 through the downlink transmission channel according to the non-continuous response signal received by the pin 1, the pin 3 outputs the POWER ON control signal to the power supply, and the power supply supplies power to the optical receiver chip according to the POWER ON control signal.

After the interval period of the low-level non-continuous signal, an input command is sent to the MCU, and after the low-level non-continuous response signal is sent to the port, the main system sends an output command to the MCU through the I2C interface again to indicate the MCU to switch the input state of the pin 1 to an output state. The MCU opens the uplink transmission channel between the pin 1 and the pin 2 and closes the downlink transmission channel between the pin 1 and the pin 3 according to the received output command. At this moment, the MCU continuously outputs the state signal of the optical receiver chip until the state of the optical receiver chip returns to the LOS-ASSERT state again, and the above processes are repeated.

Figure 9:
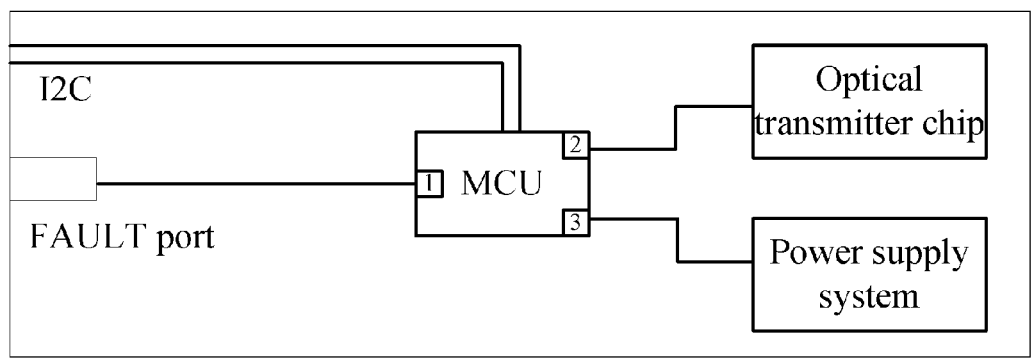

FIG. 9 exemplarily shows an optical module according to some embodiments of this disclosure. A port of the optical module is a FAULT port, and as shown in FIG. 9, the optical module mainly includes: a FAULT port, a MCU, an optical transmitter chip, a power supply and an I2C bus interface, wherein the MCU has 3 pins: a pin 1, a pin 2 and a pin 3, which correspond to the first pin, the second pin and the third pin in the above embodiments, respectively.

The connected relation between the three pins of the MCU and the FAULT port, the optical transmitter chip and the power supply is as follows: the pin 1 is electrically connected with a port pin of the FAULT port, the pin 2 is electrically connected with the optical transmitter chip, and the pin 3 is electrically connected with the power supply.

The pin 1 is configured with an input state and an output state, and the I2C bus interface controls the output state of the pin 1 to be switched to the input state through the MCU. A uplink transmission channel is formed when the pin 1 is in connection with the pin 2, and a downlink transmission channel is formed when the pin 1 is in connection with the pin 3. When the pin 1 is in the output state, the uplink transmission channel between the pin 1 and the pin 2 is opened, and the downlink transmission channel between the pin 1 and the pin 3 is closed; and when the pin 1 is in the input state, the downlink transmission channel between the pin 1 and the pin 3 is opened, and the uplink transmission channel formed between the pin 1 and the pin 2 is closed.

The pin 2 is configured as an input state and is configured to receive a state signal sent by the optical transmitter chip.

The FAULT port is a FAULT port of the optical transmitter chip.

The pin 3 is configured as an output state and is configured to send a control instruction to the power supply to control the power supply to supply power to the optical transmitter chip.

Hereinafter, the FAULT-ASSERT state being a high-level signal, the FAULT-DEASSERT being a low-level signal, the POWER SHUT being a high-level signal and the POWER ON being a low-level signal are taken as an example to illustrate that the above optical module configures an existing FAULT port, and controls the switching of the input state and the output state of the pin 1 to realize the switching of the uplink transmission channel and the downlink transmission channel, thus enabling the optical module to have a function of reporting a state signal of the optical transmitter chip to the system, and transmitting a response signal of the system into the optical module.

At some point, the MCU receives an output command transmitted by the main system through the I2C bus interface, configures the state of the pin 1 as an output state according to the output command of the I2C bus interface, and meanwhile, opens the uplink transmission channel between the pin 1 and the pin 2 and closes the downlink transmission channel between the pin 1 and the pin 3, at this moment, if the state of the optical transmitter chip is switched from the FAULT-DEASSERT state to the FAULT-ASSERT state, i.e., the state signal sent by the optical transmitter chip to the pin 2 of the MCU is switched from a low level to a high level, then the MCU processes the high-level part of the state signal into a non-continuous signal which is input to pin 1 through the uplink transmission channel between the pin 1 and the pin 2, and is output to the FAULT port by the pin 1, and then the FAULT port sends this high-level non-continuous signal to the main system; and after responding to a FAULT-ASSERT signal, the main system sends a non-continuous response signal to the FAULT port in an interval period of the non-continuous signal, and sends an input instruction to the MCU through the I2C bus interface to command the MCU to switch the state of the pin 1 from the output state to an input state wherein the non-continuous response signal is a high-level POWER SHUT control signal and is configured to indicate the controller to carry out a POWER SHUT operation on the optical receiver chip to the power supply.

The MCU receives an input instruction, switches the state of the pin 1 to an input state, closes the uplink transmission channel between the pin 1 and the pin 2, and opens the downlink transmission channel between the pin 1 and the pin 3, and at this moment, the non-continuous response signal received by the FAULT port is input to the pin 1.

The MCU controls the pin 1 to transmit the POWER SHUT control signal to the pin 3 through the downlink transmission channel according to the non-continuous response signal received by the pin 1, the pin 3 outputs the POWER SHUT control signal to the power supply, and the power supply powers off the optical transmitter chip according to the POWER SHUT control signal.

At this moment, the output state of the pin 3 keeps as a high-level state until the pin 1 is in an input state again (for example, the main system commands the pin 1 of the MCU to be switched to the input state again through I2C), and only when a low-level signal is received, the output state of the pin 3 is changed into a low-level state, i.e., the output state of the pin 3 is changed only when the input state of the pin 1 is changed in comparison with the previous time when the pin 1 is in the input state. In a word, the output state of the pin 3 is a continuous output state, and the pin 3 keeps outputting the state transmitted from the pin 1 until the high-level signal transmitted by the pin 1 to the pin 3 is changed into a low-level signal.

After the interval period of the non-continuous signal, i.e., after an input command is sent to the MCU and a non-continuous response signal is sent to the FAULT port, the main system sends an output command to the MCU again through the I2C interface to indicate the MCU to switch the input state of the pin 1 to an output state.

The MCU opens the uplink transmission channel between the pin 1 and the pin 2 and closes the downlink transmission channel between the pin 1 and the pin 3 according to the received output command. At this moment, the MCU continuously outputs the state signal of the optical receiver chip to the pin 1 until when the subsequent state of the optical transmitter chip is switched from the FAULT-DEASSERT state to the FAULT-ASSERT state again, the state signal received by the MCU is switched from a low level to a high level again, then the MCU processes a high-level part of the state signal into a non-continuous signal, and the above processes are repeated.

In some embodiments, if the optical transmitter chip returns from the FAULT-ASSERT state to the FAULT-DEASSERT state, i.e., the state signal received by the MCU is switched from a high level to a low level, the MCU processes the low-level part of the state signal into a low-level non-continuous signal, and inputs the low-level non-continuous signal to the pin 1 through the uplink transmission channel between the pin 1 and the pin 2, then the low-level non-continuous signal is output to the FAULT port by the pin 1, and then the FAULT port sends this low-level non-continuous signal to the main system; after responding to a FAULT-DEASSERT signal, the main system sends the non-continuous response signal to the FAULT port in an interval period of the non-continuous signal; an input instruction is sent to the MCU through the I2C bus interface to command the MCU to switch the output state of the pin 1 to an input state, wherein the low-level non-continuous response signal is a low-level POWER ON control signal which is configured to indicating the controller to carry out a POWER ON operation on the optical receiver chip to the power supply.

The MCU switches the output state of the pin 1 to an input state according to the received input instruction, closes the uplink transmission channel between the pin 1 and the pin 2 and opens the downlink transmission channel between the pin 1 and the pin 3, and at this moment, the non-continuous response signal received by the FAULT port is input to the pin 1; and the MCU controls the pin 1 to transmit the POWER ON control signal to the pin 3 through the downlink transmission channel according to the non-continuous response signal received by the pin 1, the pin 3 outputs the POWER ON control signal to the power supply, and the power supply supplies power to the optical transmitter chip according to the POWER ON control signal.

After the interval period of the low-level non-continuous signal, an input command is sent to the MCU, and after the low-level non-continuous response signal is sent to the FAULT port, the main system sends an output command to the MCU through the I2C interface again to indicate the MCU to switch the input state of the pin 1 to an output state. The MCU opens the uplink transmission channel between the pin 1 and the pin 2 and closes the downlink transmission channel between the pin 1 and the pin 3 according to the received output command. At this moment, the MCU continuously outputs the state signal of the optical transmitter chip until the state of the optical transmitter chip returns to the FAULT-ASSERT state again, and the above processes are repeated.

Based on the abovementioned inventive object, some embodiments of this disclosure further provide an optical module. The optical module includes: a memory storing computer readable programs and a processor, wherein the processor executes the computer readable programs to:

receive a state signal from an optical chip of the optical module, and outputting a non-continuous signal to a port pin of a port of the optical module according to the state signal, wherein the state signal is a continuous signal;

enable the port pin to output the non-continuous signal, and enabling the port pin to receive a non-continuous response signal from the port pin in an interval period of the non-continuous signal; and control the power supply to supply power according to the response signal.

In some embodiments, the processor executes the computer readable programs to implement that:

the state signal is a signal of periodic switching between a first level and a second level, and in a switching period of the first level and the second level, the state signal stays at the first level for at least 100 nS and stays at the second level for at least 100 nS.

In some embodiments, the processor includes: a first pin, a second pin and a third pin; the optical chip of the optical module is electrically connected with the second pin, and the port pin is electrically connected with the first pin; the power supply of the optical module is electrically connected with the third pin; the states of the first pin include an input state and an output state which are switched alternately; and the processor executes the computer readable programs to:

switch the first pin to the output state in a continuous period of the non-continuous signal, wherein the first pin outputs the non-continuous signal to the port pin; and switch the first pin to the input state in an interval period of the non-continuous signal, wherein the first pin receives the response signal.

In some embodiments, before outputting a non-continuous signal to the port pin, the processor further executes the computer readable programs to implement:

when the state signal is switched from the first level to the second level, set an interval of a predetermined duration based on a duration within which the state signal stays at the second level to form the non-continuous signal; and/or when the state signal is switched from the second level to the first level, set an interval of a predetermined duration based on a duration within which the state signal stays at the first level to form the non-continuous signal.

In some embodiments, after receiving the response signal, the processor also executes the computer readable program to implement:

switch the state of the first pin to an output state to enable the first pin to output the state signal to the port pin.

Although some embodiments of this disclosure have being described, once those skilled in the art learn about a basic creative concept, they may make additional variations and modifications on these embodiments. Therefore, the appended claims intend to be explained as including the preferred embodiments and all the modifications and variations falling within the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An optical module comprising a port, a controller, an optical chip, and a power supply, wherein:
   the controller is configured to receive a state signal from the optical chip, and output a first non-continuous signal to the port according to the state signal, wherein the state signal is a continuous signal;
   the port is configured to output the first non-continuous signal and receive a second non-continuous signal in response to the first non-continuous signal in an interval period of the first non-continuous signal;
   the controller is also configured to receive the second non-continuous signal from the port, and control the power supply to supply power according to the second non-continuous signal; and
   the interval period is set to be a predetermined duration based on a duration within which the state signal stays at a first level or a second level.

2. The optical module according to claim 1, wherein the state signal is a signal of periodic switching between the first level and the second level, and in a switching period of the first level and the second level, the state signal stays at the first level for at least 100 nS and stays at the second level for at least 100 nS.

3. The optical module according to claim 2, wherein:
   the controller comprises a first pin, a second pin and a third pin;
   the optical chip is electrically connected with the second pin, and the port is electrically connected with the first pin;
   the power supply is electrically connected with the third pin;
   states of the first pin comprise an input state and an output state which are switched alternately; and
   the controller is configured to:
      switch the first pin to the output state in a continuous period of the first non-continuous signal, wherein the first pin outputs the first non-continuous signal to the port; and
      switch the first pin to the input state in an interval period of the first non-continuous signal, wherein the first pin receives the second non-continuous signal.

4. The optical module according to claim 3, wherein before outputting a non-continuous signal to the port, the controller is further configured to:
  when the state signal is switched from the first level to the second level, set an interval of a predetermined duration based on a duration within which the state signal stays at the second level to form the first non-continuous signal; and/or
  when the state signal is switched from the second level to the first level, set an interval of a predetermined duration based on a duration within which the state signal stays at the first level to form the first non-continuous signal.

5. The optical module according to claim 4, wherein after receiving the second non-continuous signal, the controller is further configured to:
  switch the state of the first pin to an output state, wherein the first pin outputs the state signal to the port.

6. An optical module comprising a memory configured to store computer readable programs and a processor, wherein the processor is configured to execute the computer readable program to:
  receive a state signal from an optical chip of the optical module, and output a first non-continuous signal to a port of the optical module according to the state signal, wherein the state signal is a continuous signal;
  enable the port to output the first non-continuous signal, and enable the port to receive a second non-continuous signal coming from the port and in response to the first non-continuous signal in an interval period of the first non-continuous signal; and
  control a power supply of the optical module to supply power according to the second non-continuous signal;
  wherein the interval period is set to be a predetermined duration based on a duration within which the state signal stays at a first level or a second level.

7. The optical module according to claim 6, wherein the state signal is a signal of periodic switching between the first level and the second level, and in a switching period of the first level and the second level, the state signal stays at the first level for at least 100 nS and stays at the second level for at least 100 nS.

8. The optical module according to claim 7, wherein:
  the processor comprises a first pin, a second pin and a third pin;
  the optical chip of the optical module is electrically connected with the second pin, and the port is electrically connected with the first pin;
  the power supply of the optical module is electrically connected with the third pin;
  states of the first pin comprise an input state and an output state which are switched alternately; and
  the processor is configured to execute the computer readable programs to:
    switch the first pin to the output state in a continuous period of the first non-continuous signal, wherein the first pin outputs the first non-continuous signal to the port; and
    switch the first pin to the input state in an interval period of the first non-continuous signal, wherein the first pin receives the second non-continuous signal.

9. The optical module according to claim 8, wherein before outputting the first non-continuous signal to the port, the processor is further configured to execute the computer readable programs to:
  when the state signal is switched from the first level to the second level, set an interval of a predetermined duration based on a duration within which the state signal stays at the second level to form the first non-continuous signal; and/or
  when the state signal is switched from the second level to the first level, set an interval of a predetermined duration based on a duration within which the state signal stays at the first level to form the first non-continuous signal.

10. The optical module according to claim 9, wherein after receiving the second non-continuous signal, the processor is further configured to execute the computer readable programs to:
  switch the state of the first pin to an output state, wherein the first pin outputs the state signal to the port.

11. A method for controlling optical module, the method comprising:
  receiving a state signal of an optical chip of an optical module, the state signal is a continuous signal;
  outputting a first non-continuous signal to a port of the optical module according to the state signal;
  receiving a second non-continuous signal sent by the port, wherein the second non-continuous signal is received by the port in an interval period of the first non-continuous signal and is in response to the first non-continuous signal; and
  controlling a power supply of the optical module to supply power according to the response signal;
  wherein the interval period is set to be a predetermined duration based on a duration within which the state signal stays at a first level or a second level.

12. The control method according to claim 11, wherein the state signal is a signal of periodic switching between the first level and the second level, and in a switching period of the first level and the second level, the state signal stays at the first level for at least 100 nS and stays at the second level for at least 100 nS.

13. The control method according to claim 12, wherein:
  the optical module comprises a processor including a first pin, a second pin and a third pin,
  the optical chip is electrically connected with the second pin, and the port is electrically connected with the first pin;
  the power supply is electrically connected with the third pin;
  states of the first pin comprise an input state and an output state which are switched alternately;
  outputting the first non-continuous signal to the port comprises switching the first pin to an output state in a continuous period of the first non-continuous signal to enable the first pin to output the first non-continuous signal to the port; and
  receiving the second non-continuous signal sent by the port comprises switching the first pin to an input state in an interval period of the first non-continuous signal to enable the first pin to receive the second non-continuous signal.

14. The control method according to claim 13, wherein before outputting a first non-continuous signal to the port, the method further comprises:
  when the state signal is switched from the first level to the second level, setting an interval of a predetermined duration based on a duration within which the state signal stays at the second level to form the first non-continuous signal; and/or
  when the state signal is switched from the second level to the first level, setting an interval of a predetermined duration based on a duration within which the state signal stays at the first level to form the first non-continuous signal.

15. The control method according to claim 14, wherein after receiving the second non-continuous signal, the method further comprises:
switching the state of the first pin to an output state to enable the first pin to output the state signal to the port.

* * * * *